United States Patent [19]

Deason et al.

[11] Patent Number: 5,003,600

[45] Date of Patent: Mar. 26, 1991

[54] DIFFRACTION GRATINGS USED AS IDENTIFYING MARKERS

[75] Inventors: Vance A. Deason; Michael B. Ward, both of Idaho Falls, Id.

[73] Assignee: The United States of America as represented by the Department of Energy, Washington, D.C.

[21] Appl. No.: 388,880

[22] Filed: Aug. 3, 1989

[51] Int. Cl.$^5$ .............................................. G02B 27/44
[52] U.S. Cl. ......................................... 380/54; 342/6; 342/42; 250/237 G; 350/162.17; 235/454; 235/457; 235/470; 365/124; 365/125
[58] Field of Search .......................... 350/3.85, 162.17; 250/237 G; 365/124, 125; 235/454, 457, 470, 487; 310/313 D

[56] References Cited

U.S. PATENT DOCUMENTS

| | | | |
|---|---|---|---|
| 3,624,605 | 11/1971 | Aagard | 350/3.85 X |
| 3,643,216 | 2/1972 | Greenaway et al. | 235/457 X |
| 4,011,435 | 3/1977 | Phelps et al. | 235/454 |
| 4,014,602 | 3/1977 | Ruell | 350/3.61 |
| 4,150,781 | 4/1979 | Silverman et al. | 235/457 X |
| 4,184,700 | 1/1980 | Greenaway | 380/54 X |
| 4,400,616 | 8/1983 | Chevillat et al. | 235/487 |
| 4,506,914 | 3/1985 | Gobeli | 283/70 |
| 4,658,147 | 4/1987 | Eldering | 250/566 |
| 4,725,111 | 2/1988 | Weitzen et al. | 350/3.85 |
| 4,746,830 | 5/1988 | Holland | 310/313 D |
| 4,816,322 | 3/1989 | Pickering | 428/199 |
| 4,820,006 | 4/1989 | Constant | 350/3.85 |
| 4,837,425 | 6/1989 | Edwards | 235/457 |

OTHER PUBLICATIONS

Jurgen R. Meyer-Arendt, *Intro. to Classical and Modern Optics;* (Prentice-Hall, 1972; pp. 241, 242, 425, and 426).

Perry et al., *IBM Tech. Discl. Bull.*, (vol. 12, No. 8; 1/70).

*Primary Examiner*—Stephen C. Buczinski
*Assistant Examiner*—Bernarr Earl Gregory
*Attorney, Agent, or Firm*—Helen S. Cordell; John M. Albrecht; William R. Moser

[57] ABSTRACT

A finely detailed defraction grating is applied to an object as an identifier or tag which is unambiguous, difficult to duplicate, or remove and transfer to another item, and can be read and compared with prior readings with relative ease. The exact pattern of the defraction grating is mapped by diffraction moire techniques and recorded for comparison with future readings of the same grating.

11 Claims, 6 Drawing Sheets

1

DIFFRACTION GRATINGS USED AS IDENTIFYING MARKERS

CONTRACTUAL ORIGIN OF THE INVENTION

The United States Government has rights in this invention pursuant to Contract No. DE-AC07-76ID01570 between the U.S. Department of Energy and EG&G Idaho Inc.

BACKGROUND OF THE INVENTION

This invention relates to a method and apparatus for identifying an object. More particularly, this invention uses the techniques of moire diffraction interferometry to apply to an object a finely detailed diffraction grating whose exact structure is mapped by diffraction more techniques and recorded for comparison with future readings of the same grating. Used as an identifying mark or tag, a finely detailed grating is unambiguous, difficult to duplicate, or remove and transfer to another item, and, using the apparatus of the present invention, can be read and compared with prior readings with relative ease.

Optical devices are commonly used to read bar code labels affixed to retail goods and to provide input data used by point of sale systems in retail stores and supermarkets to retrieve price data, print customer receipts and update inventory records. Less commonly, optical devices are used to read unique identifiers which track the movement of a particular article, or to provide identification cards for persons given access to valuables, or restricted equipment or areas.

U.S. Pat. Nos. 4,014,602 and 4,400,616 disclose methods for identifying document cards by including holograms containing encoded data, and data which can only be revealed by persons knowing and having the capability of subjecting the card to the correct light source in the correct manner.

U.S. Pat. No. 4,506,914 applies a security seal to protect the contents of a package by thermally imprinting an identifying "fingerprint" into plastic and recording its unique image for future comparison.

U.S. Pat. No. 4,658,147 uses a spectrometer to analyze a retroreflected beam from an identifier with a unique spectral signature.

Each of these methods for applying identification or a tag to a card or object meets minimal requirements for repeatability, resistance to tampering and duplicating, and ease of use. The present invention meets and exceeds those requirements. An identifier or tag produced and authenticated using the techniques of moire interferometry has a high degree of detail and resolution, which discourages counterfeiting by duplication or transfer of the identifier. In addition, using this invention the tag is readily translated into quantitative data, which can be stored and accessed using data processing systems.

It is therefore a primary object of this invention to provide a novel method for applying and authenticating an identifier on an object.

In the accomplishment of the foregoing object, it is another important object of this invention to provide a method for applying and authenticating a truly unique identifier which has such a high degree of detail and resolution that it defies counterfeiting.

It is another important object of this invention to provide a portable apparatus which enables the application and authentication of the identifier by persons having limited training and understanding of moire techniques.

A yet further object of the present invention is to present an apparatus which reduces the structure of the identifier to quantitative data enabling use of data manipulation to minimize distortions during authentication.

Additional objects, advantages and novel features of the invention will become apparent to those skilled in the art upon examination of the following and by practice of the invention.

SUMMARY OF THE INVENTION

To achieve the foregoing and other objects, this invention comprises a method for creating and affixing to an object a finely detailed diffraction grating which can be used as an identifier or tag. In addition, the invention comprises PC-based data systems which reduce an interferogram generated by an identifying diffraction grating to quantitative data for storage and comparison to interferograms generated by the same or a similar interferometer during subsequent readings of the diffraction grating.

BRIEF DESCRIPTION OF THE DRAWINGS

The present invention is illustrated in the accompanying drawings where.

DETAILED DESCRIPTION OF THE INVENTION

Figure 1:
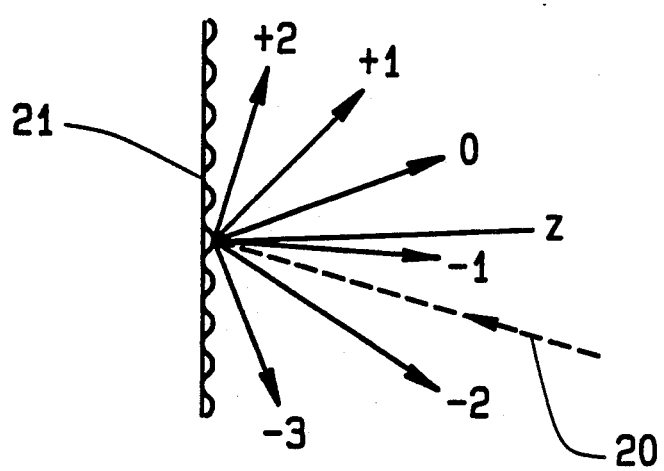
FIG. 1 shows the basic function of a diffraction grating, that is, dividing an incident beam into a number of diffracted beams.

Diffraction gratings are used to disperse the frequency components in an incident light beam into a spectrum. The exit angle is a function of the beam incident angle and its wavelength, as well as the nature of the grating (principally its groove spacing and orientation). As depicted in FIG. 1, for a laser with a single wavelength of emission, the incident beam 20 is simply redirected by the reflection grating 21 into new beams at fixed angles. The multiple beams generated are called diffraction orders. The zero order 0 is the "normal" reflection, where the angle of incidence equals the angle of reflection. The various output diffraction orders are designated $+/-1$, $+/-2$, etc. Similar effects occur with transmission gratings.

Figure 2:
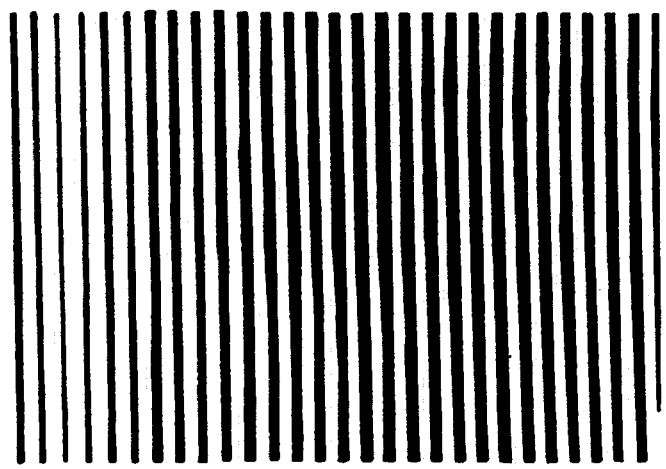
FIG. 2 is a scanning electron micrograph of an undistorted diffraction grating.

The scanning electron micrograph shown in FIG. 2 shows a conventional surface relief diffraction grating which may be used to redirect an incident beam at fixed angles. The grating is a surface with regularly spaced bars or furrows, resembling a corrugated roof, generally having a groove spacing of less than 0.001 mm, and a groove depth of about ½ the spacing. With newly developed methods interferometric techniques may be used to produce and measure finely detailed diffraction gratings with groove spacings comparable to the wavelength of light (0.0005) or finer, even up to 1/100 of this dimension.

The difficulties in producing diffraction gratings with such fine detail would, in and of themselves, discourage most efforts to duplicate gratings used as identifiers. One can expect, however, that where the supposed rewards are sufficient the counterfeiter could overcome these difficulties. This invention goes further to provide a method for manufacturing a diffraction grating which serves as a truly unique identifier and defies duplication.

The holographic exposure method for the manufacture of diffraction gratings is well known in the prior art. A photographically sensitive material is coated on a substrate and located in a position at which two coherent beams of light intersect to create a three dimensional array of light and dark regions known as interference fringes. After exposure and development using certain processing or etching chemicals, the pattern of regularly spaced bars and furrows on the grating surface will be directly related to the shape and intensity of the exposing interference fringes.

A co-pending patent application (Ser. No. 388,870, filed Aug. 3, 1989) entitled "Fiber Optic Diffraction Grating Maker" by Deason et al. which is incorporated herein by reference describes a compact portable diffraction grating maker which may be used in the practice of this invention. The grating maker is comprised of a laser beam, optical and fiber optics devices mounted on an articulated framework facilitating beam alignment, and incorporates the holographic exposure method described above.

Figure 3:
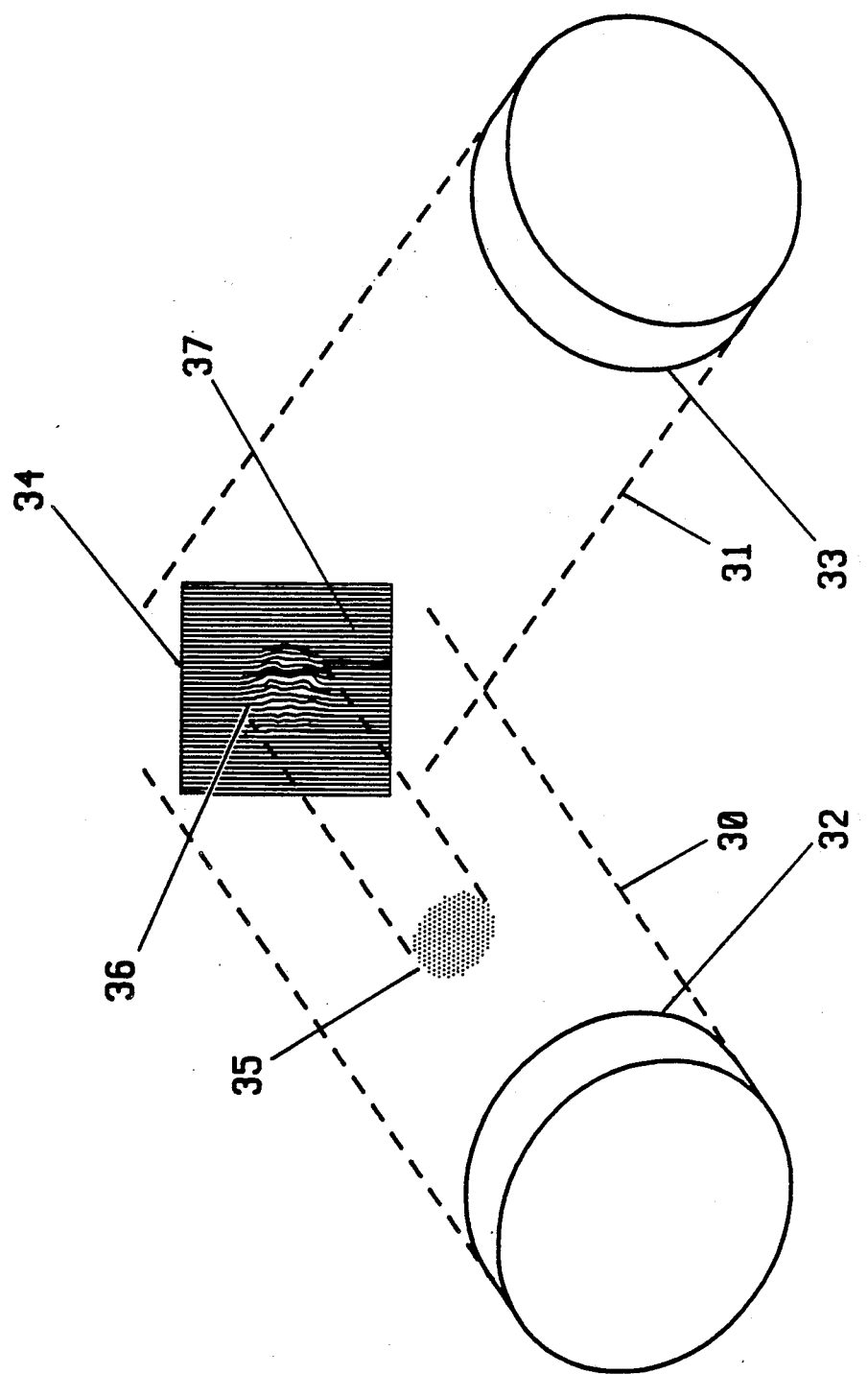
FIG. 3 is a schematic diagram depicting the generation of a randomly distorted diffraction grating.

This invention departs from the prior art in adding to the holographic exposure method a random distorting media which results in the generation of a truly unique diffraction grating. As depicted in FIG. 3, two mutually coherent laser beams 30 and 31 derived from collimating optics (lenses or mirrors) 32 and 33 respectively, are directed to a photosensitive material 34 oriented perpendicular to the bisector of the angle between beams 30 and 31. Coherency of beams 30 and 31 is assured by deriving the beams from the same laser.

The angle between beams 30 and 31 is set to conform to the following formula:

$$\sin \theta = F\lambda/2 \qquad (1)$$

where $\theta$ is the half angle between the beams, F is the spatial frequency of the desired grating in lines or grooves per mm, and $\lambda$ is the wavelength of the light source in mm. In one embodiment of the current invention, F=1200 lines/mm and $\lambda$=0.00063 mm (for a HeNe laser), so that $\theta$=22.3 degrees.

The present invention introduces into the known method of producing a diffraction grating a random distorting media 35, which may take many forms. In one embodiment, a jet of gas of a different index of refraction than air is introduced into the region between collimating optic 32 and photosensitive material 34. This will aberrate beam 30, introducing a corresponding aberration in distorted grating area 36, leaving an undistorted grating area 37.

In an alternate embodiment, beam 30 can be made to pass through a transparent plate made to serve as a random distorting media 35. A region of the transparent plate can be made distorting by, for example: (a) randomly removing a few microns of the plate using standard optical polishing methods, creating a unique "fingerprint"; (b) adding transparent material to the plate by applying various substances which affect the optical path; or (c) introducing aberrated regions by local heating, ion beam implantation, or ion beam or chemical removal of material.

In yet another embodiment, beam 30 can be made to reflect from a deformable mirror or to pass through a random distorting media 35 which is any material whose optical properties can be modified by the application of electrical, magnetic, optical, mechanical, acoustic or other means so as to introduce a wavefront change in the beam passing through or reflected from the material.

Figure 4:
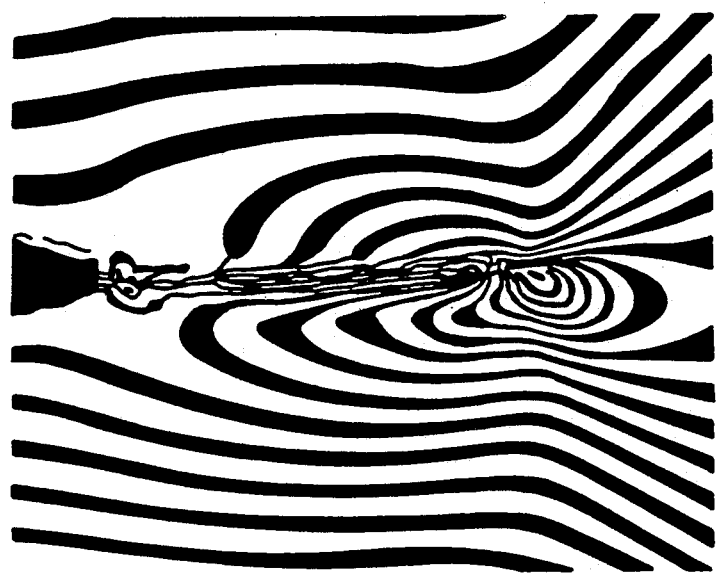
FIG. 4 is an interferogram resulting from the reading of a distorted diffraction grating by diffraction moire interferometry.

The effect of the distorting media is distributed over thousands of grooves so that the effect on each groove is extremely subtle. When observed using techniques such as holography, electron beam micrography or photolithography the distorted and undistorted gratings will appear almost identical. FIG. 4 is an interferogram resulting from the reading of a distorted diffraction grating by a diffraction moire interferometer showing subtle distortion discernible only by using moire techniques.

Having created a unique identifying diffraction grating, the method of the invention proceeds to affix the identifier to an object. In the case where the object to be identified serves as a suitable substrate, the substrate may be coated with the photosensitive material 34 and placed at the intersection of beams 30 and 31 in FIG. 3, resulting in the formation of the diffraction grating directly on the surface of the object. More often the nature of the object will require that the diffraction grating be replicated on the object.

Using methods known to the prior art, (see Daniel Post, "Moire Interferometry", *Handbook on Experimental Mechanics*, 1987, pp. 338–342), the corrugated identifier or tag made by the photographic process described above is impressed into a layer of epoxy, silicon rubber, UV curing material or other suitable substance laid on the surface of the identified object and then usually covered by a reflective metallic film.

For purposes of creating a permanent identifier or tag, the material of the replicated diffraction grating is chosen to enhance adhesion between the grating and the object, and to discourage removal and transfer. The grating can be composed of a very thin layer (0.005 inch thick) of an inert epoxy, perhaps coated with a few hundred Angstroms of a reflective material such as aluminum, gold, platinum or other metal. Removal of the grating would induce distortion in the grating which could be detected.

As a final step in replication, the tag is coated with a transparent but durable material such as glass, silica, or sapphire, serving the purpose of further preventing duplication or transfer as well as protecting the tag from environmental conditions. The presence of the coating will increase the likelihood that removal of the grating would induce detectable distortion, and will also add to the random pattern of distortion which distinguishes the tag, so that the grating could not be duplicated without the coating.

Figure 5:
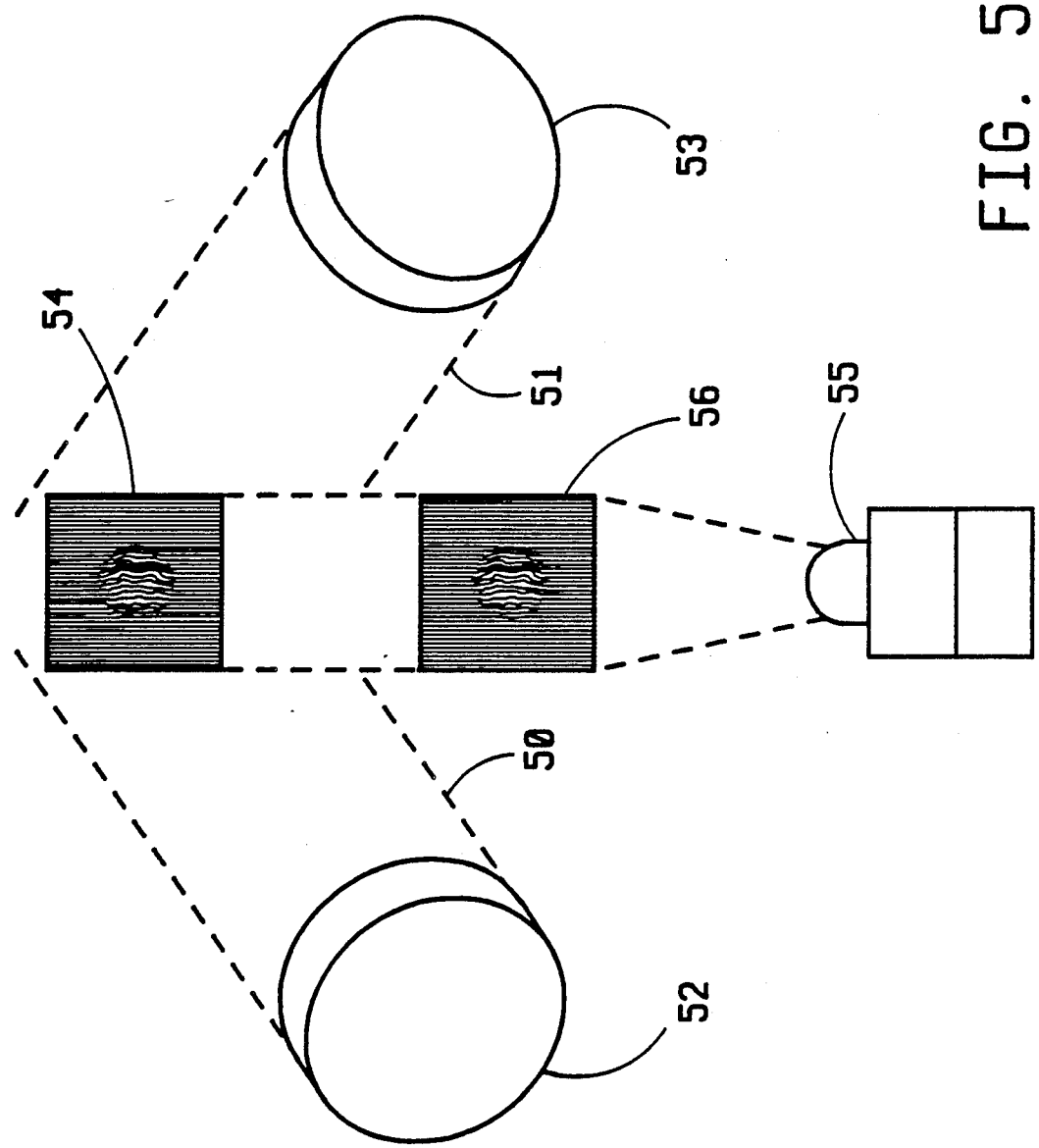
FIG. 5 is a schematic diagram depicting the imaging of an interferogram from the randomly distorted diffraction grating.

The method of the present invention proceeds then to read and record the identification tag affixed to the object using moire diffraction techniques. As depicted in FIG. 5, two mutually coherent laser beams 50 and 51 derived from the same laser (not shown) are directed by collimating optics (lenses or mirrors) 52 and 53, respectively, to the distorted diffraction grating 54 oriented perpendicular to the bisector of the angle between beams 50 and 51. An imaging device 55 records the interferogram 56 created by the two first diffraction orders of the two incident beams. Following formula (1) above, if the frequency of the diffraction grating affixed to the object is, for example, 1200 lines/mm, then the angle between the beams is 98.8 degrees, and the beams will interfere at the specimen to produce a 2400 lines/mm interference pattern. The moire pattern generated by this device will be determined by the distortions in the grating, and may be quite complex, but will be selected so it can be resolved by photographic or video techniques.

For some applications it may be sufficient to use an imaging device 55 which is the human eye, film, or a video camera, to record the image for later comparison and authentication of the object. This invention uses the data system depicted in FIG. 6 to reduce the interferogram to quantifiable data, which then becomes available for automatic retrieval and verification.

Figure 6:
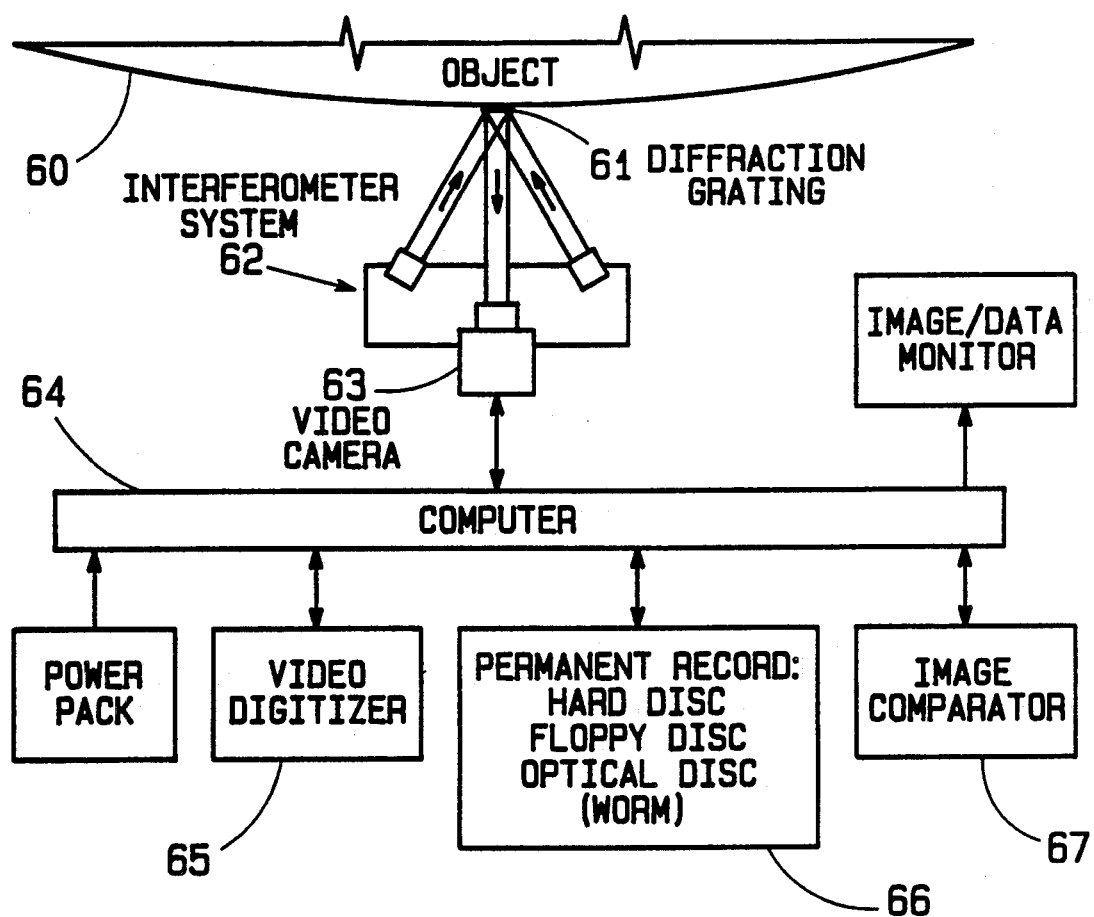
FIG. 6 is a schematic diagram of the automated data collection, storage and comparison system of the present invention.

Referring to FIG. 6, an identifying diffraction grating 61 is affixed to an object 60 and viewed by a moire interferometer system 62. The invention envisions use of a compact, portable interferometer system such as that described in U.S. Pat. No. 4,850,693 issued July 25, 1989, to Deason et al., incorporated herein by reference. Comprised of a laser beam, optical and fiber optics devices coupling the beam to one or more evanescent wave splitters, and collimating lenses, the portable interferometer is approximately 20 inches long and without power supplies and controllers weighs approximately 20 pounds. Alignment of the interferometer requires little or no operator experience with optical instruments or the method of diffraction moire interferometry.

The interference fringe pattern generated by this reading is recorded using a video camera 63. A video frame grab board in a personal computer 64 captures the data image. The image is digitized by means of a video digitizer 65, and stored in a permanent record 66 for later comparison, via an image comparator 67, to subsequent readings of the identifying grating.

Figure 7:
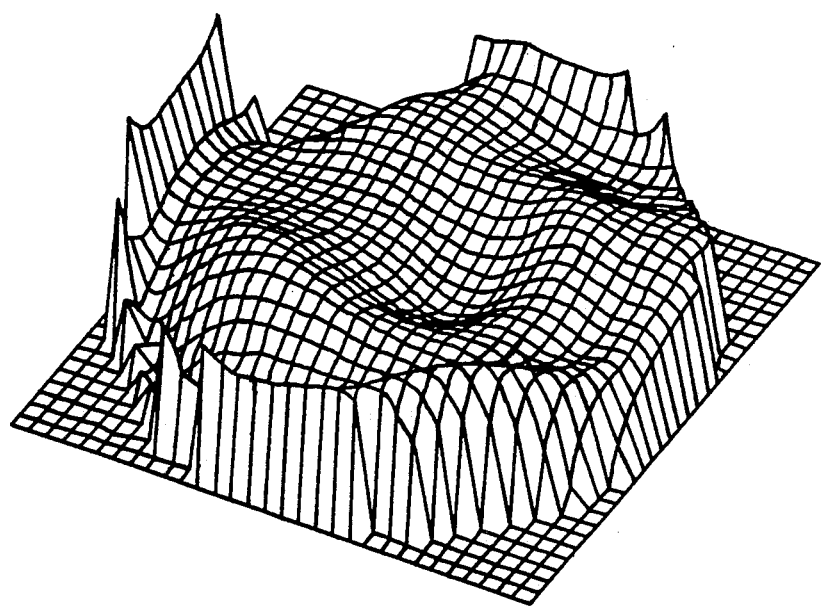
FIG. 7 is a phase map, which is equivalent to an interferogram generated from a randomly distorted diffraction grating affixed to an object.

FIG. 7 is a phase map, which is equivalent to an interferogram generated from a randomly distorted diffraction grating affixed to an object. Using commercial software such as Fast!V/AI ™ available from PhaseShift Technologies, Inc., or any similar software, the data system described above accurately and quantitatively maps out the distribution of deformation in an identifying grating with a sub-micron level of accuracy and produces a phase map such as shown in FIG. 7. This phase map is then stored for future reference and the process of reading out the grating can be repeated at any time to compare the existing grating with the original for purposes of authentication.

The sophistication of the recording and comparison methods used in an implementation of this invention will vary with the user's concern for falsification. For example, where falsification is of limited concern, a coarse, regular grating may be affixed to a group or class of items, to identify members of the group, and compared to a master by visual analysis. If restrictions are to be imposed, the pattern of an identifying grating may serve as a code, granting or limiting access or authority. Where counterfeiting is of great concern, one can use moire techniques to generate, record and evaluate a randomly distorted diffraction grating which is a truly unique identifier and cannot be duplicated or transferred without detection.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for identifying an object, comprising:
   applying to said object a diffraction grating,
   generating an interferogram which maps said diffraction grating, and
   analyzing and reducing said interferogram to a precise set of quantitative descriptors which can then be recorded and stored for future reference, and
   comparing a reading of said diffraction grating to said interferogram.

2. The method of claim 1 wherein said diffraction grating is applied to said object as a result of coating said object with photosensitive material, locating said object in a position at which mutually coherent beams of light intersect, and generating a pattern of interference fringes generated within said photosensitive material.

3. The method of claim 1 wherein said diffraction grating is a surface relief grating.

4. The method of claim 1 wherein a unique pattern is generated in said diffraction grating as a result of introducing a random distorting medium into the process of manufacturing said diffraction grating.

5. The method of claim 4 wherein said unique pattern is generated in said diffraction grating as a result of introducing a jet of gas into the region of one of said beams of light which generate said pattern in said diffraction grating.

6. The method of claim 4 wherein said unique pattern is generated in said diffraction grating as a result of passing one of said beams of light which generate said diffraction grating through a distorted transparent plate.

7. The method of claim 4 wherein said unique pattern is generated in said diffraction grating as a result of reflecting one of said beams of light which generate said diffraction grating from a deformed mirror.

8. The method of claim 1 further comprising encoding into said diffraction grating a pattern which represents encoded information.

9. The method of claim 1 further comprising covering said diffraction grating with a protective and aberating coating.

10. An apparatus for the recording and authentication of a diffraction grating affixed to an object as an identifying tag comprising:

interferometer means for generation of an interference fringe pattern diffracted by said diffraction grating, imaging means for recording said interference fringe pattern, digitizing means for digitizing and storing said interference fringe pattern, and comparator means for comparing said interference fringe pattern diffracted by said diffraction grating to subsequent readings of an interference fringe pattern alleged to have been produced by the original diffraction grating at a later time.

11. The apparatus of claim 1 wherein said imaging means is a video camera in combination with a video frame grab board in a personal computer.

* * * * *